United States Patent [19]
Rollwitz et al.

[11] 3,792,348
[45] Feb. 12, 1974

[54] METHOD OF DETERMINING STRESS IN A FERROMAGNETIC MEMBER USING MAGNETOABSORPTION

[76] Inventors: William L. Rollwitz, 213 Halbert Cir., San Antonio, Tex. 78213; John Arambula, Rural Rt. No. 3, Austin, Tex. 66006; John P. Claassen, 5800 Thames Dr., Lawrence, Kans. 78723

[22] Filed: Nov. 19, 1971

[21] Appl. No.: 200,548

Related U.S. Application Data

[63] Continuation-in-part of Ser. No. 64,620, Aug. 17, 1970, abandoned, which is a continuation of Ser. No. 654,800, July 20, 1967, abandoned.

[52] U.S. Cl. ............................................ 324/34 ST
[51] Int. Cl. ............................................ G01r 33/12
[58] Field of Search ...................... 324/34 ST, 43 R

[56] References Cited
UNITED STATES PATENTS
2,909,725  10/1959  Bell ...................................... 324/34
2,975,360  3/1961  Bell ...................................... 324/43
3,153,201  10/1964  Knight ................................. 324/0.5

FOREIGN PATENTS OR APPLICATIONS
850,733  10/1960  Great Britain ........................ 324/34

OTHER PUBLICATIONS

Now, Magneto–Absorption is Used in Stress Analysis, Product Engineering; June 5, 1967, pp. 104–106.

Primary Examiner—Robert J. Corcoran
Attorney, Agent, or Firm—Donald Gunn

[57] ABSTRACT

Magnetoabsorption apparatus for indicating changes in stress in ferrous materials and nonferrous materials including a ferrous film joined thereto, an inductively coupled radio frequency field coupled to the ferrous material, a means for applying the field in a manner to use the reversible relative permeability as a function of the stress in the member, the stress being indicated by use of a magnetoabsorption detector calibrated in stress units, and indicative of the direction, ampliutde, and type of stress.

3 Claims, 8 Drawing Figures

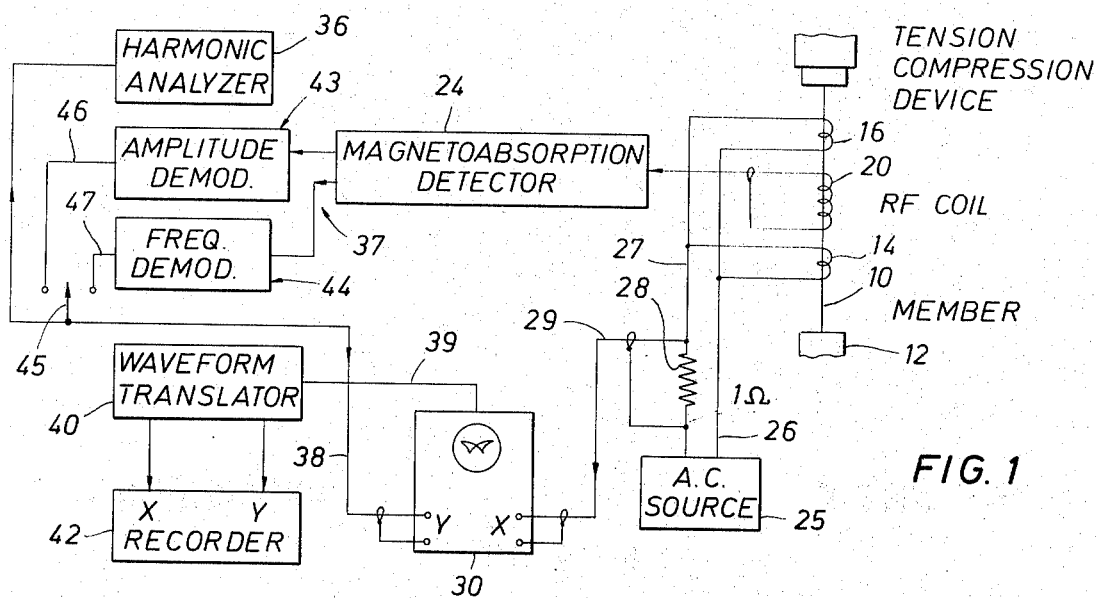
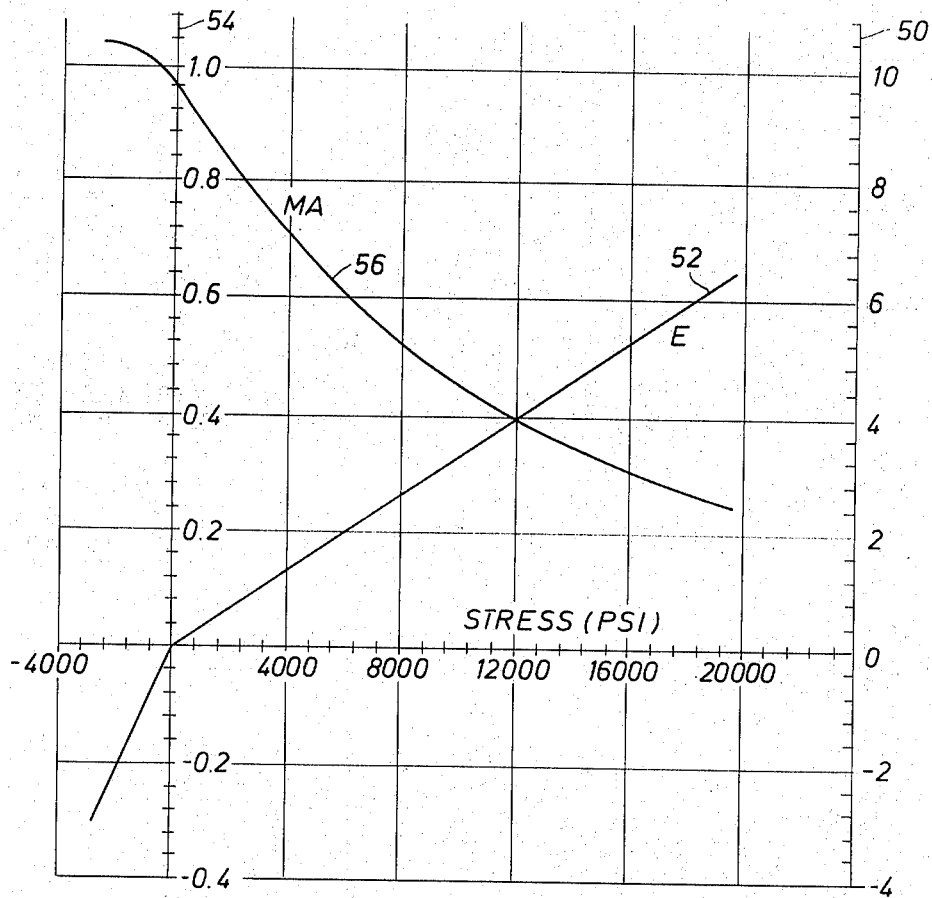
FIG. 2
William L. Rollwitz
John P. Claassen
John Arambula
INVENTORS
BY Donald Gunn
ATTORNEY William L. Rollwitz
John P. Claassen
John Arambula
INVENTORS BY Donald Gunn
ATTORNEY

“3,792,348”

METHOD OF DETERMINING STRESS IN A FERROMAGNETIC MEMBER USING MAGNETOABSORPTION

RELATED APPLICATIONS

This disclosure is a continuation-in-part of Ser. No. 64,620, filed Aug. 17, 1970 which was a continuation of Ser. No. 654,800, filed July 20, 1967, by the same inventors and bearing the same title, and now both abandoned.

SUMMARY OF PROBLEM AND INVENTION

Various and sundry techniques have been devised for measuring the stress in metallic members. For instance, strain gauges are glued or otherwise fixedly attached to the exterior surface of a metallic member to provide a means of sensing minute strains in a member which is indicative of the stress conditions of the member. As will be appreciated, certain problems exist with respect to strain gauges, not the least of which is the fact that the stress is not measured directly, but indirectly by measuring the strain. Moreover, limitations are inherent in a system requiring the strain gauge to be fixedly attached to the metallic member. In view of physical restraints and arrangements, there is a limitation of severe consequence.

An additional constraint on the strain gauge, and various other types of stress measuring systems, is that it measures only the stress changes after its application. The strain gauge cannot measure the stress in a member at the time it is affixed to the member. In contrast, the magnetoabsorption apparatus of the present invention measures the stress in the member from the time the member is brought into proximity of the apparatus. As long as the magnetoabsorption apparatus is maintained in proximity of the member, it will also measure stress variations thereafter applied.

While the foregoing discussion of strain gauge techniques is for purposes of illustration only, suffice it to say that the prior art has provided techniques for the measurement of stress in a metallic member all having numerous problems.

One of the many physical phenomena of various metals is the absorption of inductively coupled magnetic energy by a metallic member. For instance, reference can be made to scientific literature in general and the work of other individuals in this area for background information on the present invention. By way of example, reference is made to the patents of William E. Bell as being illustrative of the prior art. However, the above referred to patents only note the existence of magnetoabsorption whereas the present invention provides apparatus for measuring energy absorption as related to the relative reversible permeability of the member undergoing stress such that an output indication of the stress conditions of the member is obtained. The present invention is therefore summarized as preferably utilizing an audio frequency field to bias a metallic member in the field to provide an ever changing magnetic field and the resultant dependency of the relative reversible permeability on the stress in the member. Variations in the relative reversible permeability alter the energy absorption of the metallic member. The metallic member is included in the circuit of a magnetoabsorption indicator with a view of providing an indication of the stress on variations in the energy absorption.

Many objects and advantages of the present invention will become more readily apparent from a consideration of the following specification and drawings, wherein:

FIG. 1 is a schematic block diagram illustrating the present invention for measuring stress in an elongate member;

FIG. 2 is a graphic representation of the magnetoabsorption signal plotted versus stress in a member;

Figure 3:
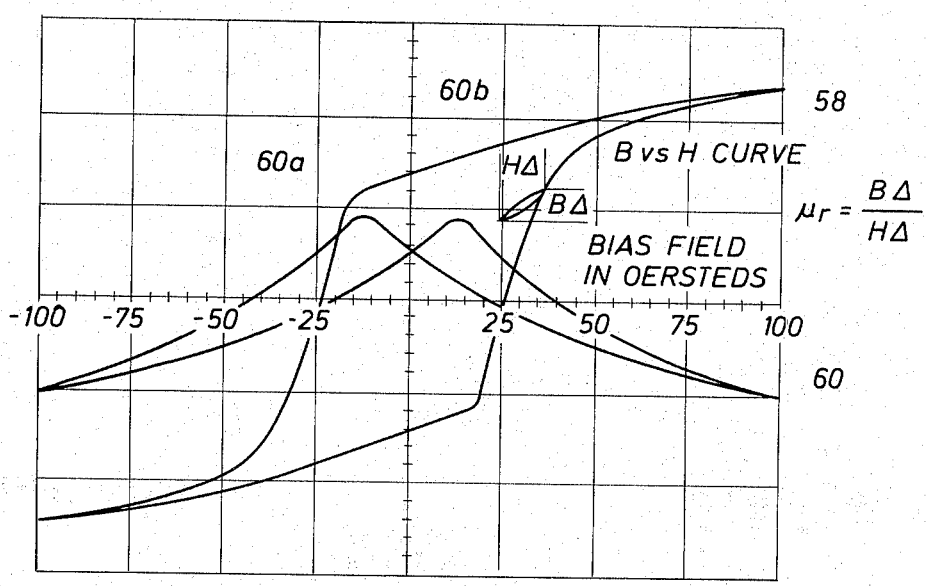
FIG. 3 is a graphic representation of the hysteresis loop having imposed thereon a graph of the relative reversible permeability of a metallic member and also graphically representing the definition of relative reversible permeability.

Attention is first directed to the apparatus shown in block form in FIG. 1. Briefly, a metallic member 10 is placed in means 12 for placing tension or compression in the member 10. The stress forming means 12 is a laboratory device, although it can be extended to include apparatus more in the form of supporting structure for the member 10. A bias magnetic field is formed in the member 10 by means of a pair of bias coils 14 and 16 whereby the magnetic bias field in the member varies the magnitude of the relative reversible permeability of the member in the manner illustrated in FIG. 3 as will be described in greater detail. A radio frequency coil means 20, part of the circuitry of the magnetoabsorption detector means 24, is placed adjacent the biased portion of the member 10, preferably between the bias coils 14 and 16, to incorporate the member 10 in the magnetic reluctance path of the coil means 20 whereby energy absorption variations by the member 10 from the coil means 20 changes the impedance of the coil means 20. The impedance change is reflected as a change in the output of the magnetoabsorption detector means 24. Variations in the stress in the member 10 effect the relative reversible permeability of the member, which in turn alters the energy absorbed by the member 10 from the radio frequency coil means 20, thereby changing operation of the detector means 24, which change is related to stress in the member 10.

Considering the invention more in detail, FIG. 1 includes an AC source 25 providing a suitable voltage and current to the bias coils 14 and 16 to establish the magnetic bias field. The source 25 is preferably one whose frequency is much lower than the frequency of the detector means 24 as will be discussed, and can be, for convenience sake, the alternating current provided by commercial power distribution systems. A pair of conductors 26 and 27 communicates the low frequency bias current to the coils 14 and 16, and a resistor 28 is placed in series with the conductor 27 for obtaining a voltage drop proportional to the current flow through the coils 14 and 16. The voltage across the resistor 28 is supplied by a conductor 29 to the X-axis input of an oscilloscope 30 illustrated in FIG. 1. It will be appreciated that the signal on the conductor 29 provides synchronization of the oscilloscope whereby the Lissajous pattern represented on the face of the scope is available for observation for photographic recording.

In terms of practical observations, it should be noted that the Helmholtz coils 14 and 16 are preferably arranged concentrically about the member 10. The radio frequency coil means 20 is also preferably arranged concentrically of the member 10 to provide optimum coupling thereto. As represented in FIG. 1, the member 10 is an elongate structure such as a rod or tubular member. However, it will be appreciated that FIG. 1 is a generic representation of a great variety of metallic members and the physical dimensions of the member are subject to variation dependent on the function of the member. Therefore, the present invention is adapted to use with members having a variety of shapes, configurations and cross-sectional areas.

In FIG. 1, the direction of the bias field is parallel to that of the stress. However, the apparatus is not limited to that angular orientation. As will be mentioned later, the bias field can be positioned perpendicular to the stress. Thus, the member 10, being a thin member, may be positioned perpendicular to a plane which includes the axis of the coils 14 and 16. If the member 10 were a plate member, the stress along the length might be either parallel or perpendicular to the bias field, the field being either along the length or across the width. Other shapes are readily considered for stress analysis of the present invention.

An indication concerning the size of the coils 14 and 16 is helpful since the number of turns in the coils and the current flow therethrough are subject to wide variations. The number of turns and the coil current preferably provide a magnetic field in the member 10 which is quite significant in magnitude and which may exceed the magnetic saturation of the member 10, dependent upon the magnetic characteristics thereof.

Considering the coil means 20, a satisfactory coil size is from 0.010 inches to about two inches in length, and from 0.010 inches to about two and three-eighths inches in diameter, although coils up to 12 inches have been constructed. Copper wire of No. 28 AWG with 100 closely wound turns has been found satisfactory for the larger coils.

The member 10 includes, by way of example, ferromagnetic materials such as a selected percentage of nickel or iron ranging up to relatively pure materials. Of course, certain materials are not responsive to magnetoabsorption techniques. One example is aluminum. However, a thin film of ferromagnetic metal is joined to non-ferromagnetic material, and the magnetic absorption signal which is derived from the thin film is indicative of the stress in the aluminum. In the preferred embodiment, a thin film of ferromagnetic material is attached to nonferromagnetic materials which compose the member 10. Mechanical techniques of attaching the thin film are suitable for placing of the thin film member on the member 10, although the preferable technique is plating. As an example, nickel is plated on nonferromagnetic materials (such as aluminum) by known chemical processes available to those skilled in the art. One primary consideration for the thin film material is good bonding of the thin film to the nonferrous material resulting in equal deformation of both materials whereby equal strain in the two materials signifies an equality of stresses inversely proportional to the modulus of elasticity of the two materials. The use of a thin film of ferromagnetic material is of no great consequence to the output indication of the present apparatus since the thin film only changes a constant of proportionality which is absorbed within the system constant of proportionality.

Returning again to the apparatus in FIG. 1, the bias field provided by the coils 14 and 16 preferably approximates upwards of 200 oersteds for typical material although fields as low as a few oersteds have been used. It has usually been accepted that the magnitude of the radio frequency magnetic field intensity in the member 10 should be much less than the magnitude of the magnetic bias field in the member 10. The detector means 24 is operated at about 500 kilohertz as a preferred frequency. Of course, it will be appreciated that frequencies of the magnetoabsorption detector means 24 can vary widely, even to the gigahertz range. At any event, a frequency is selected for the detector means 24 whereby radio frequency energy is absorbed in the member 10 from the coil means 20.

Attention is next directed to the magnetoabsorption detector means 24 and operation of the magnetoabsorption detector means 24 of the present invention. The magnetoabsorption detector can be as simple as a resistor in series with a parallel resonant circuit including the inductance of the coil means 20. The absorption of energy by the member 10 from the coil 20 results in a decrease in the voltage across the resonant circuit. For most applications, a marginal oscillator is preferable. By the term marginal oscillator, reference is intended to an oscillator which is operating at load or bias values close to the point where oscillations cease. The oscillator means 24 is represented in block form in FIG. 1 since the variety of oscillations available to those skilled in the art is quite extensive. However, all oscillations can be considered to be the equivalent of an amplifier stage having a gain in excess of one with positive feedback from the output to the input. As ordinarily used, that is, in applications other than use as a marginal oscillator, oscillators having positive feedback initiate an envelope of oscillations of ever expanding amplitude whereby the amplifier is eventually driven into saturation and therefore becomes a nonlinear device. At this point, it will be appreciated that gain of the amplifier is immaterial and the amplifier is operated with fixed gain. Moreover, the precise phase of the feedback is subject to a wide range of variations and this additional factor relates to the ability of the oscillator to lock in on a particular frequency and to stay put.

Since the amplifier portion is saturated in the "normal" operating mode of a conventional oscillator, any variation in the amplitude of oscillation, such as that caused by the magnetoabsorption (energy absorbed by the member 10 from the coil means 20), is diminished by the decreased gain slope of the saturated amplifier.

By way of contrast, the marginal oscillator means 24 of the present invention is preferably operated at a characteristic point very close to the point where oscillations cease under which conditions it is in marginal oscillation. The amplifier is kept well below its saturation value. The level of this weakly oscillating system is stabilized at a particular low value by the use of a nonlinear element separate from the amplification part of the oscillator. Typically, this may vary from an amplitude limiter in series with the amplifier in the feedback loop, to a separate amplifier-peak detector system used to control the bias of the oscillator and thereby its level. Thus, modulation of the oscillation level caused by the magnetoabsorption signal will be amplified linearly by the marginal oscillator. With this in view, it will then be appreciated that small variations of impedance in the coil means 20, which is included in the oscillator circuitry as a functional circuit element, cause substantial changes in the operation of the oscillator means 24. Moreover, the oscillator means 24 is preferably a device wherein the coil means 20 is located in the circuit where the voltage across it is linearly increased in level by an amplifier generally associated with the oscillator means. The amplified output includes a substantial signal deviation resulting from the small incremental variation in the impedance of the coil means 20. In view of this, a small fluctuation in the relative reversible permeability of the member 10 is, in effect, amplified at the output of the oscillator means 24 whereby the output signal, the amplitude modulation of the amplifier, is defined as the magnetoabsorption amplitude signal which will be discussed in greater detail hereinafter. As will be recognized, the output signal varies in proportion to variations in magnetoabsorption energy dissipated in the member 10 by the radio frequency field of the coil 20.

When the member 10 absorbs energy from the coil means 20, the energy absorption not only changes the effective losses in the coil but also changes the inductance of the radio frequency coil. In fact, experimental evidence has shown that the percentage change in the effective inductance of the coil is the same magnitude as the percentage change in the effective resistance of the coil caused by the magnetoabsorption. Therefore, the frequency of the oscillator will be changed such that frequency demodulation of the output of the oscillator yields a signal in which the relative reversible permeability is the same shape as that illustrated in FIG. 3. Thus, it is possible to obtain a stress related signal, either a magnetoabsorption amplitude signal from an amplitude detection means 43, or a magnetoabsorption frequency signal from a frequency demodulation means 44. Both have been found quite satisfactory as the signals are nearly the same amplitude and shape. The desired signal is selected by switch means 45 since both vary with stress and can be used for its measurement.

As would be expected, both the amplitude and frequency detected outputs of the amplifier in the marginal oscillator type of magnetoabsorption detector means 24 are necessarily nonsinusoidal wave forms as shown by the Lissajous pattern 60 of FIG. 3. Therefore, a harmonic analyzer 36 is connected to the selected output of the magnetoabsorption demodulation means 43 or 44 to measure the amplitudes of the various harmonics in the signal for a quantative determination of the signal shape from the harmonic amplitudes. Additional useful information is obtained from the phase of each of the harmonics relative to the phase of the current yielding the magnetic bias field. Thus, the Fourier analysis of the output wave forms will permit a quantative description of the shape of the magnetoabsorption signal. More details concerning the harmonic analysis will be noted with reference to FIG. 4. The harmonic analyzer 36 preferably is a purchased item and various commercial models are known which are suitable for use with the present invention.

The output of the marginal oscillator means 24 is also communicated by a conductor 38 to the Y-axis of the oscilloscope means 30 previously noted. This provides the second input necessary to obtain the Lissajous pattern depicted in FIG. 1 and is representative of the magnetoabsorption signal provided by the present invention.

For further analysis of operation of the present invention, a conductor 39 communicates the magnetoabsorption signal from the oscilloscope means 30 to a wave form translator 40 and thence applies the X and Y axes signals to an X-Y recorder means 42.

Reference is next made to FIG. 2 of the drawings which is a graphic representation of the stress measuring abilities of the present invention for a selected material. Arbitrarily selected in obtaining the data of FIG. 2 is a one-eighth inch diameter aluminum rod having a relatively thin nickel plating thereon which is placed in the loading device 12. Compressive stress is indicated by the negative sign on the norizontal axis whereas tension is indicated by the positive numerals to the right of the origin. Arbitrary units for elongation are indicated for the right-hand coordinates 50 and the curve indicated by the numeral 52 is the plot of elongation (E) of the member with respect to stress. It will be noted that the curve 52 indicates an apparent deviation in the modulus of elasticity for the material, but this is no doubt related to buckling of the relatively long and thin member used in obtaining the data represented graphically in FIG. 2.

Of particular significance to the graphic representation of FIG. 2 is the scale of values indicated in 54 wherein the magnetoabsorption signal amplitude measured in volts and indicated by the symbol (MA) plots the curve 56. The irregularity at the upper part of the curve 56 occurs due to the fact that a small diameter wire was used in obtaining the data of FIG. 2 and bending occurred during compressive stresses.

It will be noted that FIG. 2 graphically illustrates the fact that the magnetoabsorption amplitude signal (MA) is related to the stress in the member 10 whereby appropriate calibration of the output apparatus means used with the present invention will indicate stress directly. And further, overlooking the deflection in the plot 52, it will be noted that the invention is operative for both tension and compression in the member 10. In most field installations, the problem of buckling of a thin, elongate member such as that used to obtain the data in FIG. 2, does not occur.

Attention is next directed to FIG. 3 which illustrates B/H curve 58 imposed on the graph of the relative reversible permeability indicated by the curve 60. FIG. 3 was obtained from unannealed nickel wire. For purposes of definition for the present invention, the relative reversible permeability, $\mu_r$, plotted at 60 in FIG. 3 is the value of the ratio of the flux density, $B\Delta$, of the radio frequency magnetic field in the member 10, to the intensity, $H\Delta$ of the radio frequency magnetic field caused by the radio frequency current in coil 20. Thus, the relative reversible permeability is the radio frequency permeability of the minor hysteresis loop shown in FIG. 3.

Figure 4:
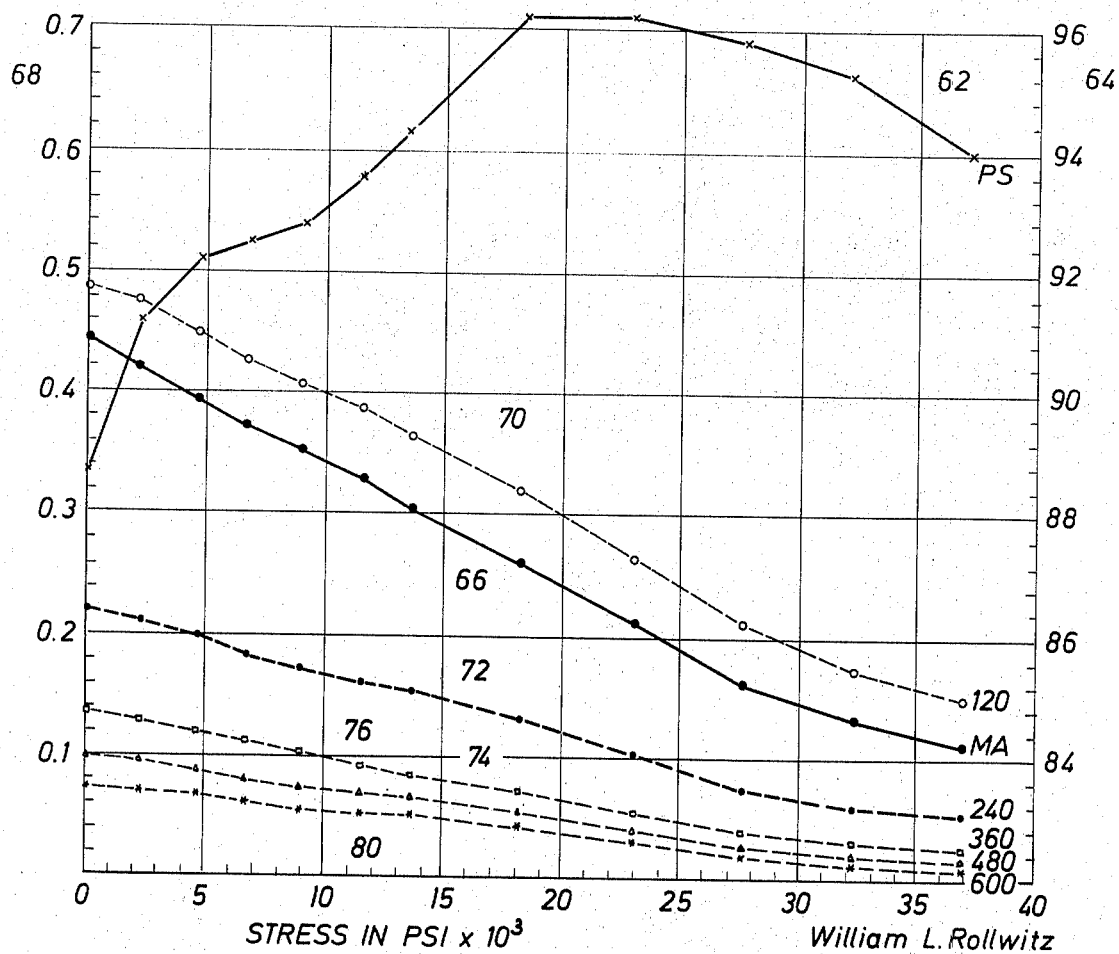
FIG. 4 is a graph of several fourier or harmonic components of the magnetoabsorption signal plotted against stress in the member.

Attention is next directed to FIG. 4 which graphically represents various measurements deduced from stressing cold-rolled nickel wire. In the graph of FIG. 4, the curve 62 represents the peak separation measurement of the relative reversible permeability curve for the material and is measured in oersteds as indicated by the scale at 64. The peak separation is the width of the peaks of the permeability curve 60 exemplified in FIG. 3, and is measured between the points 60a to the point 60b; the magnetoabsorption signal is the curve 66 as measured in volts indicated by the coordinate scale 68.

Various harmonics in the magnetoabsorption signal 66 are plotted individually from data obtained by the harmonic analyzer 36 previously noted in FIG. 1. For instance, the lowest frequency measured was 120 hertz and the signal strength of this harmonic is represented at 70. Additional harmonics at 240, 360, 480 and 600 hertz were measured, and the data plotted in curves 72, 74, 76 and 80, respectively. Of interest is the fact that the total magnetoabsorption signal 66 is smaller in amplitude than the sum of the harmonics. This indicates that a phase shift occurs between the various harmonics and that phase information is contained in the output of the magnetoabsorption detector means 24. The phase information provides a further indication of the stress in the specimen 10. Also, the decrease in the magnetoabsorption amplitude signal indicates that an increase in stress in the member 10 is associated with an increased resistive loss in the circuitry of the marginal oscillator means 24. Also, measurements of the magnetoabsorption frequency signal, by means of the frequency demodulation means 44, also provides a signal which is proportional to the stress in a manner similar to the magnetoabsorption amplitude signal.

Several suggested uses are within the scope of the present disclosure and are directed to the present invention. For instance, the device of the present invention is useful with axially loaded columns and other structural supports to obtain an indication of the actual stress condition therein. This can be achieved notwithstanding the fact that the stressed member is surrounded by other supporting structure and is therefore inaccessible. For instance, in the analysis of an architecturally decorated and enclosed beam within a building, access to the present invention is not prevented since the inductively coupled apparatus of the present invention is able to incorporate the beam or column within the marginal oscillator and detector means 24. Moreover, the device of the present invention is not limited to axial stress and strain. For instance, the member 10 can be loaded as a cantilever and variations in the magnetoabsorption signal can be calibrated at the output means. Since a system constant of proportionality is usually derived for apparatus of this nature which incorporates all physical characteristics and variations, no problem is anticipated in this regard since the data obtained for calibration will reflect all constants of the whole of the system. The device of the present invention is preferably used with a calibrated volt meter movement communicated with the output of the oscillator means 24 whereby the rms indication of the meter reads pounds per square inch. Of course, those skilled in the art will recognize other ways of deriving and indicating data provided by use of the present invention.

It is also possible to use both the amplitude and shape of either or both the magnetoabsorption amplitude (MA) and the magnetoabsorption frequency (MF) signals to determine the value of stress in a member. If the direction of the applied magnetic bias field is varied, the measurements of the magnetoabsorption signals can be used to determine the direction of the stress in the member 10 and whether it is in tension or compression. In tension for many types of material, the magnetoabsorption signals are generally smaller with the bias field parallel to the stress direction than measurements with the bias field perpendicular to the stress direction. For some materials, this characteristic reverses when reversing from tension to compression; that is, larger signals result from bias field parallel the stress direction rather than perpendicular. For other types of materials, both of these effects are reversed. It has been found that the ratio of the magnitudes of harmonic amplitudes taken from the magnetoabsorption signals with parallel and then perpendicular bias field directions can also be related to the amount and direction of the tension and compression in a member.

Considering the foregoing possibilities, in greater depth, the development hereinafter in part related to FIGS. 5, 6 and 7, will correlate the following various magnetoabsorption signals:

1. The direction of the stess externally applied to or residual in the specimen;
2. The magnitude of the stress; and,
3. The type of stress, whether it is tension or compression.

Broadly, it will be shown also that certain effects are reversed when the magnitude bias is changed from parallel to perpendicular. Thus, with a bias field which is parallel to the stress to be measured, the following is true:

1. For materials having a positive magnetoabsorption constant, increasing tension increases the amplitude of both the magnetoabsorption amplitude and frequency signals, while increasing compression decreases their amplitudes.

2. For materials having a negative magnetoabsorption constant, increasing tension decreases the magnetoabsorption amplitude and frequency signals while increasing compressing increases their amplitudes.

These effects are reversed if the bias field is altered from parallel to the stress in a position perpendicular to the stress.

The radio frequency coil 20 is readily represented in the circuit of the magnetoabsorption detector 24 having both resistive and inductive components. The relative reversible permeability of the material places an incremental portion in both components, or $\Delta R$ and $\Delta L$.

These values are theoritically given as follows:

$\Delta R = K_R G_R (\mu H_B)^{1/2} - K_0$ $\Delta L = K_L G_L (\mu H_B)^{1/2} - K_0$ Where:

$\Delta R$ = Incremental change in coil resistance attributed to magnetoabsorption of specimen.

$\Delta L$ = Incremental change in coil inductance attributed to magnetoabsorption of specimen.

$K_R$ = A constant for the material involved.

$K_L$ = A constant for the material involved.

$G_R$ = Geometrical constant for the material involved.

$G_L$ = Geometrical constant for the material involved.

$\mu$ = Radiofrequency permeability.

$H_B$ = Bias field strength from the bias coils.

$K_0$ = A constant describing the residual magnetism effects.

There is no simple expression describing the radiofrequency permeability used in the foregoing equations. Hence, resort to certain graphical representations may be helpful. Thus, attention is directed to FIG. 5. In FIG. 5, the bias field strength is varied sinusoidally during an elapsed interval to create the hysteresis loop shown in the B/H curve of FIG. 5. Inasmuch as the radiofrequency permeability is given by the slope, it will be seen to vary at various locations along the hysteresis loop. This is shown in FIG. 5.

Figure 5:
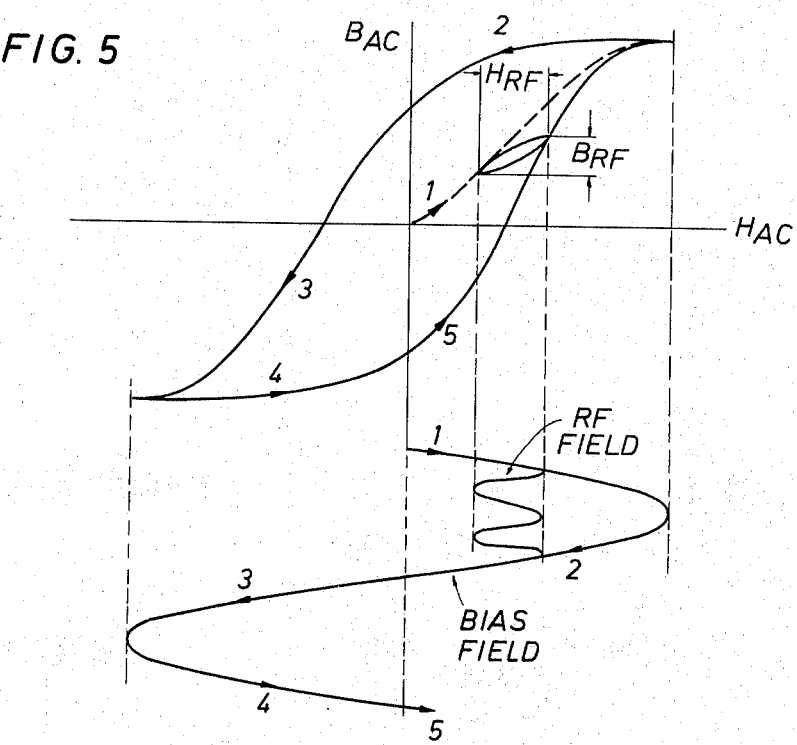
FIG. 5 is a hysteresis loop of a ferromagnetic material under the influence of two magnetomotive forces, one a radio frequency and the other at low frequencies.
Figure 6:
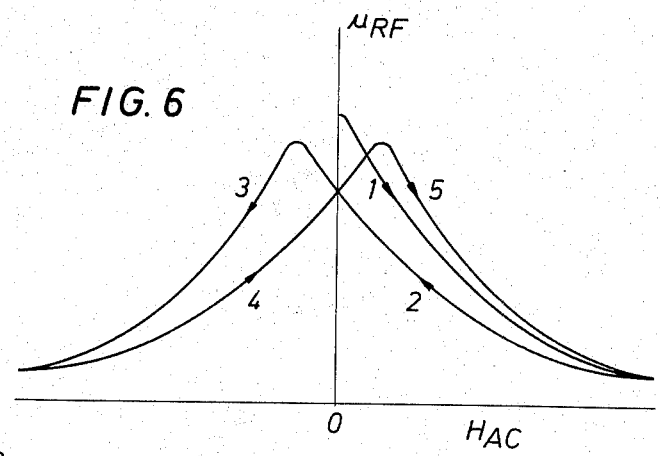
FIG. 6 shows the radio frequency permeability as a function of the alternating magneto-motive force.

The ordinate in FIG. 6 is radiofrequency permeability. The various segments of the curve correspond to like numbered segments found in FIG. 5.

Figure 7:
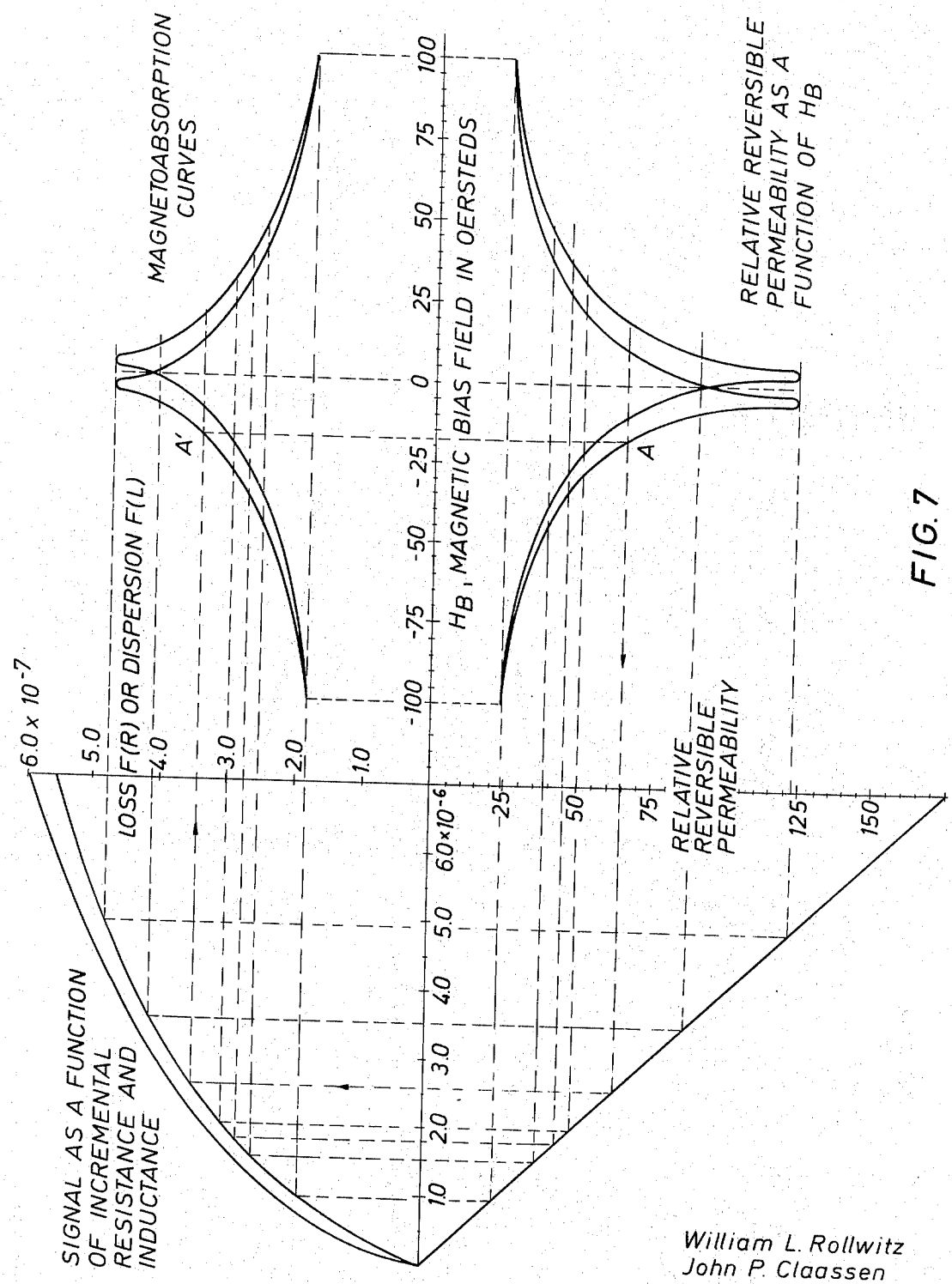
FIG. 7 shows a graphical derivation of the magnetoabsorption curve from the permeability curve through the use of the magnetoabsorption amplitude and frequency signals; and, FIG. 8 shows a graphical determination of stress in a member using the present invention.

An actual value illustrating the hysteresis effect for the incremental changes in coil resistance and inductance is more easily obtained by using the graphic methods of FIG. 7. The resultant curve, in the upper right hand corner, is either the magnetoabsorption amplitude or frequency signal dependent on which data is used. Of course, dependent on whether the amplitude or frequency signal is used, a choice must be made of one of the two curves at the upper left.

In summation, the incremental values vary at least partially with the square root of the permeability as developed and shown in FIGS. 5, 6 and 7. Since both the resistive and inductive values are altered, the measurements to be extracted can be selectively taken from one or the other. As shown by the graphs, the two signals are nearly the same shape and nearly the same in amplitude. This permits flexibility in the taking of data as will be developed below.

Figure 8:
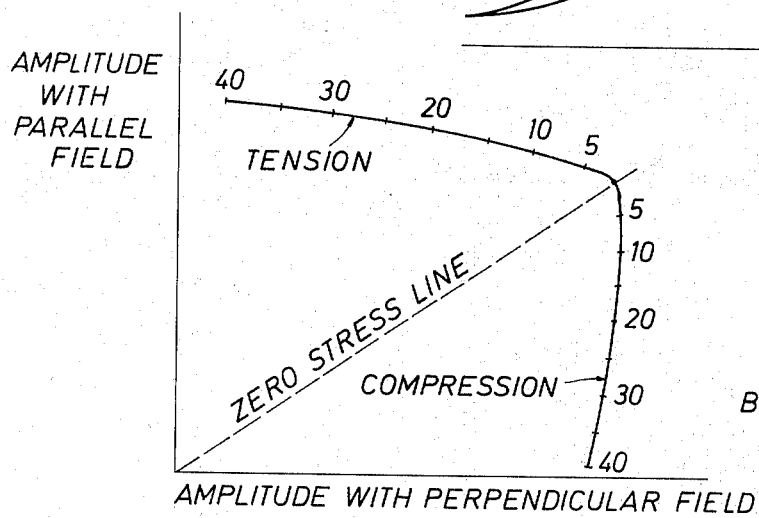

Consider a specimen for which a stress analysis is desired. The amplitude of one of the two magnetoabsorption signals is measured with the low frequency bias field first parallel and then perpendicular to the stress. Assume further that the member is in a structurally indeterminate structure but one in which the member in question can be subject to a change in stress. The data necessary to determine the actual stress requires that the changes in stress be graphed versus the magnetoabsorption signal. Two graphs are made, one with the bias field parallel and the other with it perpendicular. The graphs will readily show the resident stress in the member. Moreover, if calibration of the changes in stress is available, then the actual stress can be shown graphically. This is shown in FIG. 8.

The stress is thus dependent on the angle of a line drawn from the origin to the point of curve intersection and its deviation from a 45° line. Thus, when the measured magnetoabsorption signal is greater with parallel bias than with perpendicular bias, then the unknown stress is tension. Its magnitude is given by the angle from the zero stress line or the 45° line of FIG. 8. When the reverse is true, the stress is compressive. Assuming tension to be positive, stress is given by:

$$P = K(\arctan VA/VB - 45°)$$

Where:
$P$ = Stress in pounds per square inch.
$K$ = PSI/degree.
$VA$ = Magnetoabsorption signal, parallel bias.
$VB$ = Magnetoabsorption signal, perpendicular bias.

Of course, the bias field intensity is constant and the stress on the specimen is held constant. Clearly, positive and negative values of stress are calculated, and correspond to tension and compression as noted above.

While the foregoing discloses the preferred embodiments of the present invention, it is desired to protect by Letters Patent all uses of the present invention which fall within the scope of the appended claims.

What is claimed is:

1. A method of determining the stress in a ferromagnetic member comprising the steps of:
   placing the member in a field of radiofrequency coil in a manner to make the impedance of the coil at least partially dependent on the member;
   placing a low frequency bias field in the member to provide sufficient energy to the field that the relative reversable permeability of the member is at least partially dependent on the stress in the member;
   altering the direction of the bias field between positions which are parallel to and perpendicular to the direction of the stress in the member;
   changing the stress in the member incrementally from a first value to a second value;
   observing the relative changes in impedance of the radio frequency coil as the bias field is positioned parallel and perpendicular to the direction of stress;
   determining from the relative changes in impedance whether the stress is tension or compression;
   changing the stress in the member from a first to a second value in which the relative direction of change is known and the actual values of stress are indeterminate, and thereafter observing the relative changes in the impedance of the radio frequency coil, and the determining from the relative changes in impedance the magnitude of the stress; and,
   graphically representing the impedance changes in a quadrant wherein the axes are the relative stress and the change in impedance to form a first curve thereon of data obtained with the bias field parallel to the stress, and a second curve thereon of data obtained with the bias field perpendicular to the stress, determining a graphic point of intersection of the two curves.

2. The method of claim 1 including the step of placing a zero stress line on the graphic representation including the two curves, and determining the stress originally in the member dependent on the angle of the zero stress line, and a line drawn from the origin of the graph to the point of intersection of the two curves.

3. The method step of claim 2 wherein the stress is given by the relationship:

Stress = $K(\arctan Za/Zb - 45°)$

Where:
$K$ = A constant in PSI/degree.
$Za$ = Impedance with the bias field parallel.
$Zb$ = Impedance with the bias field perpendicular.

* * * * *